Nov. 3, 1959     G. W. BICKERSTAFF, JR     2,911,242
CORNER CONNECTOR

Filed June 29, 1956     2 Sheets-Sheet 1

INVENTOR.
George W. Bickerstaff, Jr.
BY Webb, Mackay & Burden
HIS ATTORNEYS

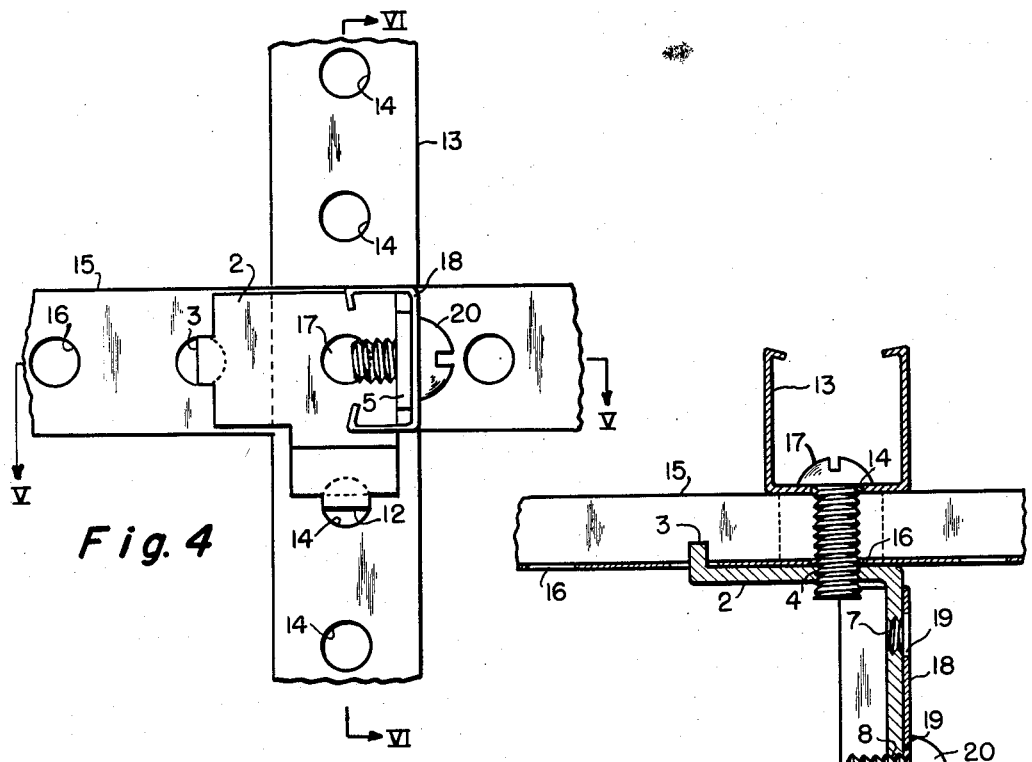

United States Patent Office 2,911,242
Patented Nov. 3, 1959

2,911,242

CORNER CONNECTOR

George W. Bickerstaff, Jr., Pittsburgh, Pa., assignor to Steel City Electric Company, Pittsburgh, Pa., a corporation of Pennsylvania Application June 29, 1956, Serial No. 594,954

10 Claims. (Cl. 287—54)

This invention relates to a method and apparatus for constructing a rigid connection between elongated members such as channels.

Many expedients have been used in the past in an attempt to secure channels together at their point of junction to form a rigid shelving support. Such expedients have included brackets of complex design requiring the use of at least five nuts and bolts for proper assembly of the structure. As the number of nuts and bolts required for assembly increases, the complexity of design and cost of the connector and the cost of assembling the finished structure increase also.

The present invention avoids the difficulties of the prior art by providing a simple, compact corner connector utilizing only two bolts for assembly which when assembled with a desired number of channel members results in a rigid structure capable of withstanding heavy loads. Extra supporting braces are not necessary with the present invention to maintain the channel members in alignment due to the presence of a two point connection between each channel member and the bracket. The present invention further possesses a remarkable speed of assembly since it is necessary to tighten only two bolts.

In the drawings I have illustrated a present preferred embodiment of my invention in which:

Figure 4 is an enlarged front elevation view of the structure shown in Figure 1;

Figure 5 is a section taken on the line V—V of Figure 4; and

Figure 6 is a section taken on the line VI—VI of Figure 4.

Figure 1:
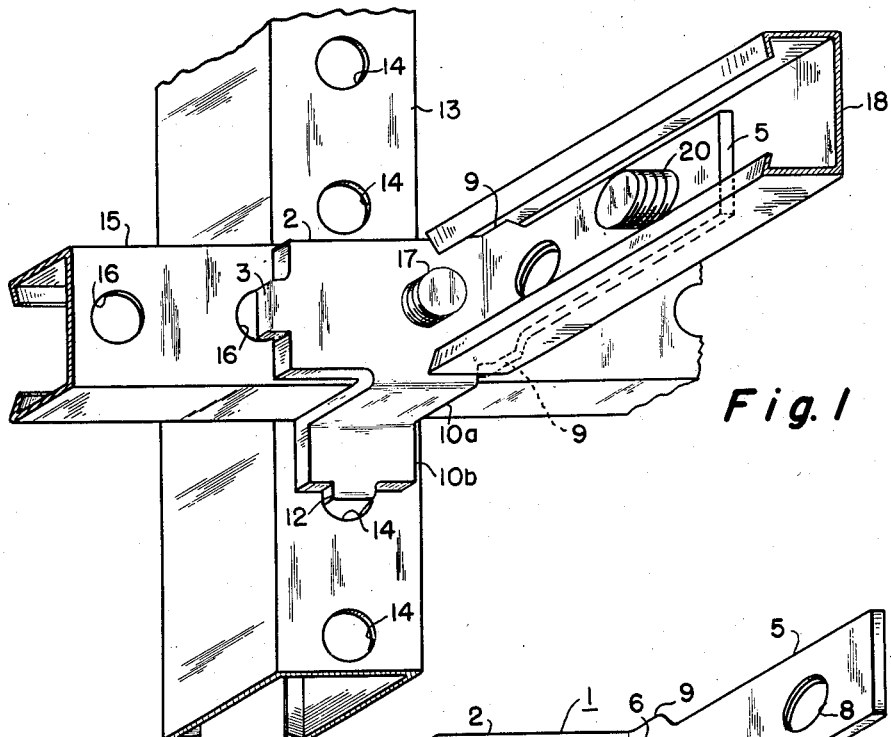
Figure 1 is a perspective view of a portion of an assembled structure using my corner connector.

An L-shaped corner connector according to my invention, generally designated 1, comprises a flat elongated leg 2 having at one end an integral tongue 3 extending at right angle to the plane of the leg and a threaded hole 4 cut in the leg in a position to be explained hereinafter. A second flat elongated leg 5 integral with the leg 2 along an edge 6 extends perpendicularly to leg 2 and in a direction opposite to tongue 3. At least one and preferably two threaded holes 7 and 8 are cut in leg 5 in a position to be explained hereinafter. The leg 5 is of lesser width than the leg 2 except for shoulders 9 adjacent edge 6. A third leg 10 having two parts, 10a and 10b, is integral with the leg 2 at the end of the leg 2 adjacent the leg 5. The part 10a extends at right angles to the plane of the leg 2 in the same direction as the tongue 3 and the part 10b integral with 10a extends parallel to the plane of leg 2. An integral tongue 12 at the end of part 10b extends from 10b in a direction parallel to 10a.

Figure 2:
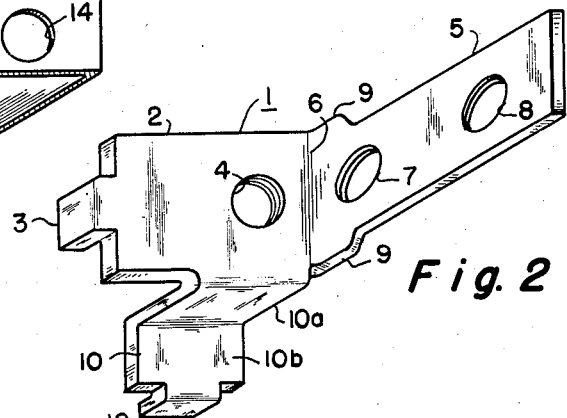
Figure 2 is a perspective view of the corner connector.
Figure 3:
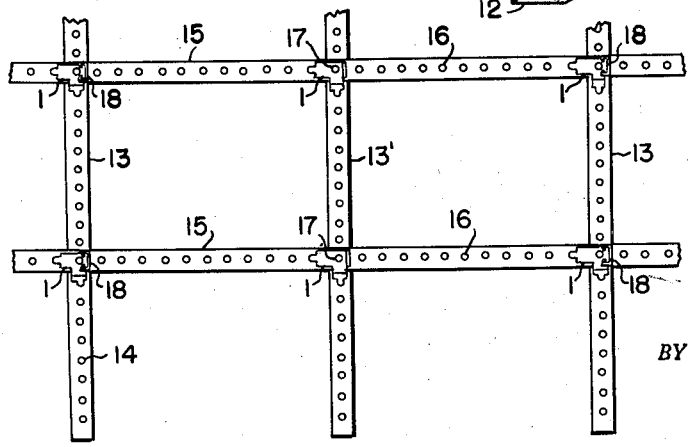
Figure 3 is a front elevation view of a portion of an assembled structure using my connector.

In the construction of shelving supports for example, as shown in Figures 1 and 3, a column channel 13, having a plurality of equally spaced holes 14 therealong, is positioned in an upright condition. A stringer channel 15, having equally spaced holes 16 therealong, is then positioned at any desired position along the column channel 13. The corner connector is then positioned in the manner shown in Figure 1 such that the tongue 3 is inserted into one of the holes 16 of the stringer 15 and at the same time, tongue 12 is inserted into one of the holes 14 of the column channel 13. Referring to Figure 2 it will be noted that the tongues 3 and 12 extend in the same direction but that the legs with which they are integral lie in parallel planes spaced from each other by an amount equal to the length of the portion 10a. This is also the depth of the stringer channel 15. Viewing Figures 4 and 5, it will be seen that the tongues 3 and 12 are spaced relative to each other so that when a tongue 3 is in one of the holes 16 of the stringer 15, and a tongue 12 is in one of the holes 14 of the column 13, another of the holes 16 and another of the holes 14 will be aligned with each other and with the hole 4 in the connector. A threaded bolt 17 is then inserted through holes 14 and 16 and threaded into hole 4 to obtain a rigid connection between the connector and the two channels 13 and 15.

A third cross piece channel 18 is then positioned on leg 5 by sliding the channel over shoulders 9. The channel 18 has holes 19 along its length positioned such that they will coincide with either one or both of holes 7 and 8 in leg 5. A threaded bolt 20 is inserted through one of the holes 19 in channel 18 and threaded into at least one of the holes 7 or 8 in the leg 5 to obtain a rigid connection of channel 18 with respect to the connector and channels 13 and 15. To insure a rigid connection, an additional bolt may be threaded into the other hole of leg 5. However, normally, the two-point rigidity obtained by cooperation between the shoulders 9 and only one bolt threaded into either hole 7 or 8 is sufficient to maintain the cross piece channel in proper alignment. The stringer channel 15 is maintained in a rigid relationship by a two-point connection; i.e., bolt 17 and tongue 3. Likewise, the column channel 13 is maintained in a rigid alignment by a similar two-point connection; i.e., bolt 17 and tongue 12.

An important aspect of the present invention is that the channels 15 and 18 are mounted with their webs in a vertical plane to obtain maximum rigidity over a long span.

A further advantage of the present invention is that additional bottom channels 13 may be added to an already completed and loaded shelving structure. For example, as shown in Figure 3, if the assembled structure comprises the members 13, 15 and 18 and it is found that this is not sufficient to support the load positioned on the shelving assembly, an additional member 13¹ can be inserted along the member 15 at any desired position to give additional support without disassembling the whole shelving structure or removing any of the load carried thereon. An additional cross piece channel 18 may also be added to a completed shelving structure without disassembling the whole structure by merely placing the channel 18 with its web horizontal over the leg 5 and then turning the channel 90° and pushing it toward the edge 6. This ease of construction is due to the limited length of shoulders 9.

The prior art corner connectors require as many as five nuts and bolts for assembly and cost about $1.50. The present bracket requires only two bolts for assembly and costs about sixty cents. Thus, a substantial savings both in the initial cost of the connector and bolts and also in the cost of assembly is achieved by the present invention.

While I have described a present preferred embodiment of my invention, it is to be understood that it may be otherwise embodied within the scope of the following claims.

I claim:

1. A connector for assembling a plurality of elongated members each extending in a different direction, including an L-shaped element, one leg of which contains at least two means for connecting said leg to an elongated member, one of said means being a tongue which extends into a hole in the elongated member, the other leg containing at least one means for connecting the leg to an elongated member, a third leg integral with and extending away from one of the aforesaid legs and containing only an integral tongue for connecting said third leg to an elongated member.

2. A connector described in claim 1 wherein at least two of said legs contain holes as part of the connecting means.

3. An assembled structure including at least three elongated channels containing a plurality of holes along their lengths, a connector joining said channels, the connector and two of the channels being connected together by a single means, the connector having tongues which enter holes in each of said two channels, the third elongated channel connected to the connector by another connecting means.

4. An assembled structure described in claim 3 wherein at least two of the elongated channels are in crosswise relationship, with a hole in one channel being aligned with a hole in the second channel, and a hole in the connector being in alignment with the aligned holes in the channels.

5. An assembled structure described in claim 3 wherein said single means passes through holes in the connector and at least two of the elongated channels.

6. An assembled structure described in claim 3 wherein a portion of said connector is L-shaped and each of the legs of the L contain holes.

7. An assembled structure described in claim 5 wherein said connector has at least three legs, each of which is associated, at least in part with a different elongated channel.

8. A one-piece connector including a first flat leg having a hole therein, a tongue integral with one end of said first leg, a second flat leg integral with said first leg and having a hole therein, said second leg disposed substantially perpendicular to the plane of the first flat leg, and a third leg integral with the first leg and being disposed, at least in part, perpendicular to the plane of the first flat leg but in a direction from said first leg opposed to the direction of said second flat leg, said third leg having an integral tongue on its end remote from the first leg.

9. A connector for assembling elongated members having holes therein, including an L-shaped member, each leg of which contains a hole, one of said legs having a tongue disposed in a plane parallel to and in a direction opposite to the other leg, said tongue being positionable in one of said holes in the elongated members, and a third leg integral with the leg having a tongue.

10. A connector as recited in claim 9 wherein the third leg has a tongue positionable in a hole in a second elongated member.

References Cited in the file of this patent

UNITED STATES PATENTS

| | | |
|---|---|---|
| 279,249 | Jackson | June 12, 1883 |
| 781,068 | Hewitt | Jan. 31, 1905 |
| 1,336,971 | Levene | Apr. 13, 1920 |
| 1,358,247 | Robinson | Nov. 9, 1920 |
| 1,962,396 | Katz et al. | June 12, 1934 |